United States Patent [19]

Oppenländer

[11] Patent Number: 4,793,684
[45] Date of Patent: Dec. 27, 1988

[54] ARRANGEMENT FOR FORMING A STRAIN-RELIEF CONNECTION BETWEEN AN OPTICAL FIBRE CABLE AND A COUPLING DEVICE

[75] Inventor: Theodor Oppenländer, Cologne, Fed. Rep. of Germany

[73] Assignee: U.S. Philips Corp., New York, N.Y.

[21] Appl. No.: 87,589

[22] Filed: Aug. 20, 1987

[30] Foreign Application Priority Data

Aug. 22, 1986 [DE] Fed. Rep. of Germany ....... 3628570

[51] Int. Cl.⁴ .................................................. G02B 6/36
[52] U.S. Cl. .................................. 350/96.23; 350/96.20
[58] Field of Search ............... 350/96.20, 96.21, 96.22, 350/96.23

[56] References Cited

U.S. PATENT DOCUMENTS

| | | | |
|---|---|---|---|
| 4,493,529 | 1/1985 | Doty | 350/96.20 |
| 4,588,256 | 5/1986 | Onstott et al. | 350/96.21 |
| 4,645,295 | 2/1987 | Pronovost | 350/96.20 |
| 4,653,848 | 3/1987 | Kloots | 350/96.22 |
| 4,697,870 | 10/1987 | Richards | 350/96.20 |
| 4,708,428 | 11/1987 | Loeffler et al. | 350/96.20 |

FOREIGN PATENT DOCUMENTS 2648995 5/1977 Fed. Rep. of Germany.

*Primary Examiner*—John D. Lee
*Attorney, Agent, or Firm*—William L. Botjer

[57] ABSTRACT

The invention relates to an arrangement for forming a strain-relief connection which is safeguarded against axial displacement between an optical fibre cable containing strain-relief elements, at least one end of an optical waveguide which is closed by means of a sleeve projecting from the end portion of the cable, to a housing of a coupling device by means of a spacer sleeve which radially engages with both the housing and the end portion of the cable sheath. Excessive bending of the ends of the optical waveguide can be prevented when a covering sleeve clamping the strain-relief elements of the cable is connected to the end portion of the cable sheath, the covering sleeve including a longitudinal section having radially outwardly projecting form-coupling elevations and in that the spacer sleeve has a center portion which surrounds the ends of the optical waveguide with some spacing, and in that the spacer sleeve consists of two half-shells.

8 Claims, 1 Drawing Sheet

ARRANGEMENT FOR FORMING A STRAIN-RELIEF CONNECTION BETWEEN AN OPTICAL FIBRE CABLE AND A COUPLING DEVICE

BACKGROUND OF THE INVENTION

The invention relates to an arrangement for forming a strain-relief connection which is safeguarded against axial displacement between an optical fibre cable containing strain-relief elements, at least one end of an optical waveguide which is closed by means of a sleeve projecting from the end portion of the cable, to a housing of a coupling device by means of a spacer sleeve which radially engages with both the housing and the end portion of the cable sheath.

In such a known arrangement disclosed in DE-OS No. 28 48 995 the spacer sleeve has one end which is provided with an internal thread screwed onto a housing of the coupling device. The other end is crimped onto the end portion of the cable sheath. In the manufacture of the tension-proof connection of the strain-relief elements of the optical fibre cable to the housing of the coupling device, there is a risk that the ends of the optical waveguide are subjected to excessive bending.

SUMMARY OF THE INVENTION

It is an object of the invention to provide an arrangement of the type defined in the opening paragraph such that excessive bending of the ends of the optical wave guide is prevented.

This object is achieved in that a covering sleeve clamping the strain-relief elements of the cable is connected to the end portion of the cable sheath, the covering sleeve including a longitudinal section having radially outwardly projecting form-coupling elevations and in that the spacer sleeve has a centre portion which surrounds the ends of the optical waveguide with some spacing, and in that the spacer sleeve consists of two half-shells.

In mounting of the two-shell spacer sleeve of a construction according to the invention, the position of the housing relative to the end portion of the cable sheath has already been fixed during the lateral positioning of the first half-shell. When no impermissible large bends are detected, the second half-shell is applied.

A preferred embodiment is characterized in that the form-coupled connection, which is formed longitudinally on the cover sleeve to the spacer sleeve can be effected with several axial intervals.

Thus, to compensate for the different free lengths of the optical waveguides of different cables determined by their tolerances the distance between the housing and the end portion of the cable sheath can be adapted.

An advantageous constructional embodiment consists in that the form-coupled connection is obtained by meshing equidistant circumferential grooves of the corresponding parts.

With respect to in particular the temporary mounting of the half-shells, it is provided that these shells must be pressed to each other by at least one elastic annular element. An advantageous way of a long-lasting mounting of the half-shells is characterized in that they are held together by a heat-shrunk tubular sleeve. Preferably, the tubular sleeve is of such a length that it extends beyond the cable sheath and the housing of the connecting device.

The construction according to the invention renders the use of angular couplers possible, the spacer sleeves having an angle or a bend in the forward direction and being divided in the plane of the angle.

BRIEF DESCRIPTION OF THE DRAWING

The invention and its advantages will now be described in more detail by means of advantageous embodiments and with reference to the accompanying drawings.

DETAILED DESCRIPTION OF THE INVENTION

Figure 2:
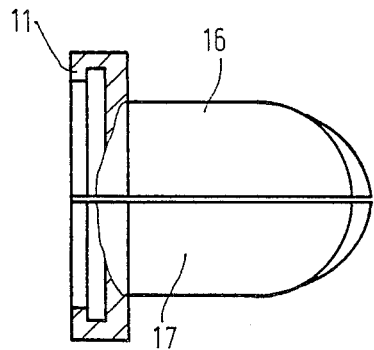
FIG. 2 is a partial sectional front view of an offset embodiment of a spacer sleeve according to the invention.

Two optical waveguides 2 and 3 project from the end portion 1 of the cable sheath of an optical cable, the ends of these optical waveguides being inserted into bushings 4, these ends being surface-ground with the faces of these bushings 4 at the ends not shown in the drawing. The ends of the optical waveguides 2 and 3 must be arranged slackly and without tensile stress. On spring-back of the bushing 4 during a coupling procedure, the resulting additional length of the optical waveguide must be caused to bulge to some extent. For this reason the components of the coupling device are placed around the free space of the optical waveguide at quite a large distance.

A cover sleeve is connected to the end portion 1 of the cable sheath in a tensile-stress resistant manner. This sleeve has a crimp portion 5 which is crimped onto the exterior of the end portion 1, such that the strain-relief elements of the optical cable are clamped. After the crimping process the crimp region is covered by a shrinkable sleeve 14.

The sleeve further has a longitudinal section 6 on the outer surface of which a plurality of sequential annular elevations 7 are arranged axially and equidistantly, each of which may be closed or may helically extend into the subsequent one. These elevations engage with angular grooves at the inner periphery of an abutting end section of the spacer sleeve part to form an axially operating form coupling. The opposite end section of the distance sleeve 8 engages with the housing 9, which for this purpose has a full annular groove 10 in which the radially, inwardly directed annular shoulder 11 of the spacer sleeve 8, fits.

Figure 1:
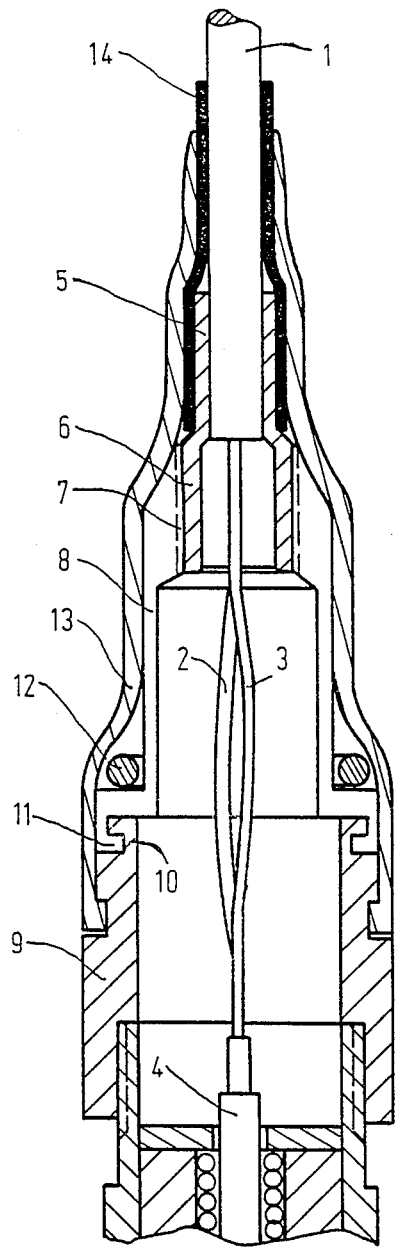
FIG. 1 is a longitudinal sectional view through an arrangement according to the invention.

According to the invention, the spacer sleeve 8 consists of two half-shells, First the first half-shell shown in FIG. 1 is placed in position from the rear side. In this process the axial arrangement relative to the longitudinal section 6 of the sleeve is chosen such that the ends of the optical waveguides 2 and 3 are only slightly convex. The distance can readily be adapted because a plurality of equidistant and equally formed annular elevations or annular grooves are provided on the longitudinal section 6 and on the end portion of the distance sleeve. An abutting half-shell of the spacer sleeve 8 is already sufficient to fix the axial position. This position cannot be displaced during the application of the second half-shell.

The half-shells of the spacer sleeve 8 are provisionally held together by a tightly embracing O-ring 12. The final connection is formed by a heat-shrunk tubular sleeve 13 which extends from the housing 9 to beyond the end portion 1 of the cable sheath, such that an attractive smooth outer surface is obtained.

FIG. 1 shows a straight spacer sleeve 8. When necessary, the embodiment according to the invention enables curved coupling devices to be employed by forming the spacer sleeve as shown in FIGS. 2 and 3, such that the end portion 1 of the cable sheath is folded through an angle of 90° (in FIG. 3 45°) relative to the direction of plugging.

Figure 3:
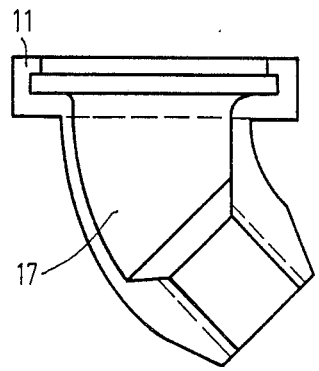
FIG. 3 is a side view of a half-shell of the spacer sleeve according to FIG. 2.

The reference numerals 16 and 17 in FIG. 2 designate both half-shells. The part shown in FIG. 3, which is assigned to the longitudinal sction 6 of the spacer sleeve, corresponds to the embodiment of FIG. 1.

The construction of the form-coupled elements selected for the constructional embodiment has proved to be advantageous. It will be obvious that the present invention is not restricted to the embodiments described hereinbefore, but that many variations are possible without departing from the scope of the present invention.

I claim:

1. An arrangement for the stress-relieved connection between an optical fiber cable and the housing of a coupling device, said arrangement comprising:
   a covering sleeve having a first part and a second part, said first part being constructed and arranged to engage said optical fiber cable;
   a spacer sleeve having a first part for engagement with said housing, a second part for engagement with said covering sleeve and a center portion spaced apart from said optical fiber cable, said spacer sleeve being formed from two half shells joined along a plane parallel to their longitudinal axis; and
   interengaging grooves and elevations disposed on said second part of said covering sleeve and said second part of said spacer sleeve to dispose said covering sleeve in engagement with at least one of said two half shells of said spacer sleeve.

2. The arrangement as claimed in claim 1 wherein said interengaging grooves and elevation disposed on said covering sleeve and said spacer sleeve permit longitudinal relative displacement of said covering sleeve and said spacer sleeve to thereby facilitate positioning of said optical fiber cable in a strain-relieved condition.

3. The arrangement as claimed in claim 1 wherein one of said two half shells of said spacer sleeve is capable of engaging and positioning said covering sleeve to facilitate relative displacement between said covering sleeve and said spacer sleeve.

4. The arrangement as claimed in claim 1 wherein said half shells forming said spacer sleeve are joined by an annular elastic element disposed around said half shells.

5. The arrangment as claimed in claim 1 further including a heat shrinkable sleeve disposed around said covering sleeve and said spacer sleeve.

6. The arrangement as claimed in claim 5 wherein said heat shrinkable sleeve extends beyond said covering sleeve to engage at least a portion of said optical fiber cable.

7. The arrangement as claimed in claim 1 wherein said first part of said spacer sleeve includes an inwardly directed annular shoulder for engagement with a corresponding groove disposed in said housing.

8. The arrangement as claimed in claim 1 wherein said spacer sleeve comprises first and second curved half shells for disposing said optical fiber cable at an angle to said housing.

* * * * *